United States Patent [19]

Cox et al.

[11] 4,099,815

[45] Jul. 11, 1978

[54] STRUCTURAL ELEMENTS

[75] Inventors: Terence Allan Cox, Polesworth; David Roger Lewis, Belgrave, both of England

[73] Assignee: Swish Products Limited, England

[21] Appl. No.: 688,184

[22] Filed: May 20, 1976

[30] Foreign Application Priority Data

May 30, 1975 [GB] United Kingdom ............... 23572/75

[51] Int. Cl.² .............................................. A47B 47/00
[52] U.S. Cl. ................................ 312/330 R; 312/111; 312/140; 403/295
[58] Field of Search ...................... 312/330, 111, 140; 403/295, 298

[56] References Cited

U.S. PATENT DOCUMENTS

| 1,859,799 | 5/1932 | Rix | 312/140 |
|---|---|---|---|
| 1,916,894 | 7/1933 | Rix | 312/140 |
| 3,218,097 | 11/1965 | Bowers et al. | 403/295 |
| 3,675,594 | 7/1972 | Kritske | 312/111 |
| 3,687,512 | 8/1972 | Alston | 312/330 |
| 3,722,932 | 3/1973 | Dougall | 312/111 |
| 3,729,241 | 4/1973 | Schippers et al. | 312/111 |
| 3,791,091 | 2/1974 | Albrizzi | 312/140 |
| 3,901,572 | 8/1975 | Litchfield | 312/330 R |
| 3,973,371 | 8/1976 | Heller | 403/295 |

FOREIGN PATENT DOCUMENTS

| 2,461,474 | 1974 | Fed. Rep. of Germany | 403/295 |
|---|---|---|---|
| 1,021,239 | 1966 | United Kingdom | 312/330 |
| 1,204,030 | 1970 | United Kingdom | 403/295 |
| 1,242,225 | 1971 | United Kingdom | 312/111 |
| 1,378,300 | 1974 | United Kingdom | 403/295 |

Primary Examiner—Paul R. Gilliam
Assistant Examiner—Victor N. Sakran
Attorney, Agent, or Firm—Norris & Bateman

[57] ABSTRACT

Components for forming a drawer or other tray-like structure comprise hollow wall members, conveniently plastics extrusions, defining mortice sockets in their ends, and corner or front connecting members, conveniently plastics mouldings, having tenons engageable in said sockets and retained by triangular or similar detents which snap-engage with complementary apertures in walls of the sockets. The detents are carried on the free ends of resilient tongues, which free ends are directed away from the free ends of the tenons, and edge faces of the detents diverge away from their leading tips to a substantially broader abutment part which may include an undercut abutment face for greater security. Provision may be made for the tenons to be glued as well as or instead of being solely retained by the detents, of which the following is a specification.

4 Claims, 3 Drawing Figures

STRUCTURAL ELEMENTS

This invention relates to elements for use in forming structures, particularly drawers for furniture and similar box or tray-like structures.

The object of the invention is to facilitate manufacture and assembly of such structures and to provide components which are particularly adaptable and convenient in use.

According to the invention there is provided a set of structural members including a wall member defining a mortice socket; and a connecting member including a body portion and at least one tenon formation engageable in the mortice socket to locate the body portion in predetermined alignment with the wall member to form a structure; characterised in that the tenon formation has a resilient tongue whose free end is directed away from the free end of said formation, which tongue carries a retaining detent projecting laterally from the tenon formation and having a leading end facing in the direction of the free end of the tenon formation and away from the free end of the tongue and a pair of edge faces diverging away from said leading end to an abutment part of the detent which is substantially broader than said end, the wall member being provided with a cooperating aperture in the mortice socket complementary to the shape of the detent and into which the latter snap-engages on full insertion of the tenon formation.

Conveniently the detent and complementary aperture are triangular.

A preferred embodiment of the invention is now more particularly described with reference to the accompanying drawings wherein.

Figure 1:
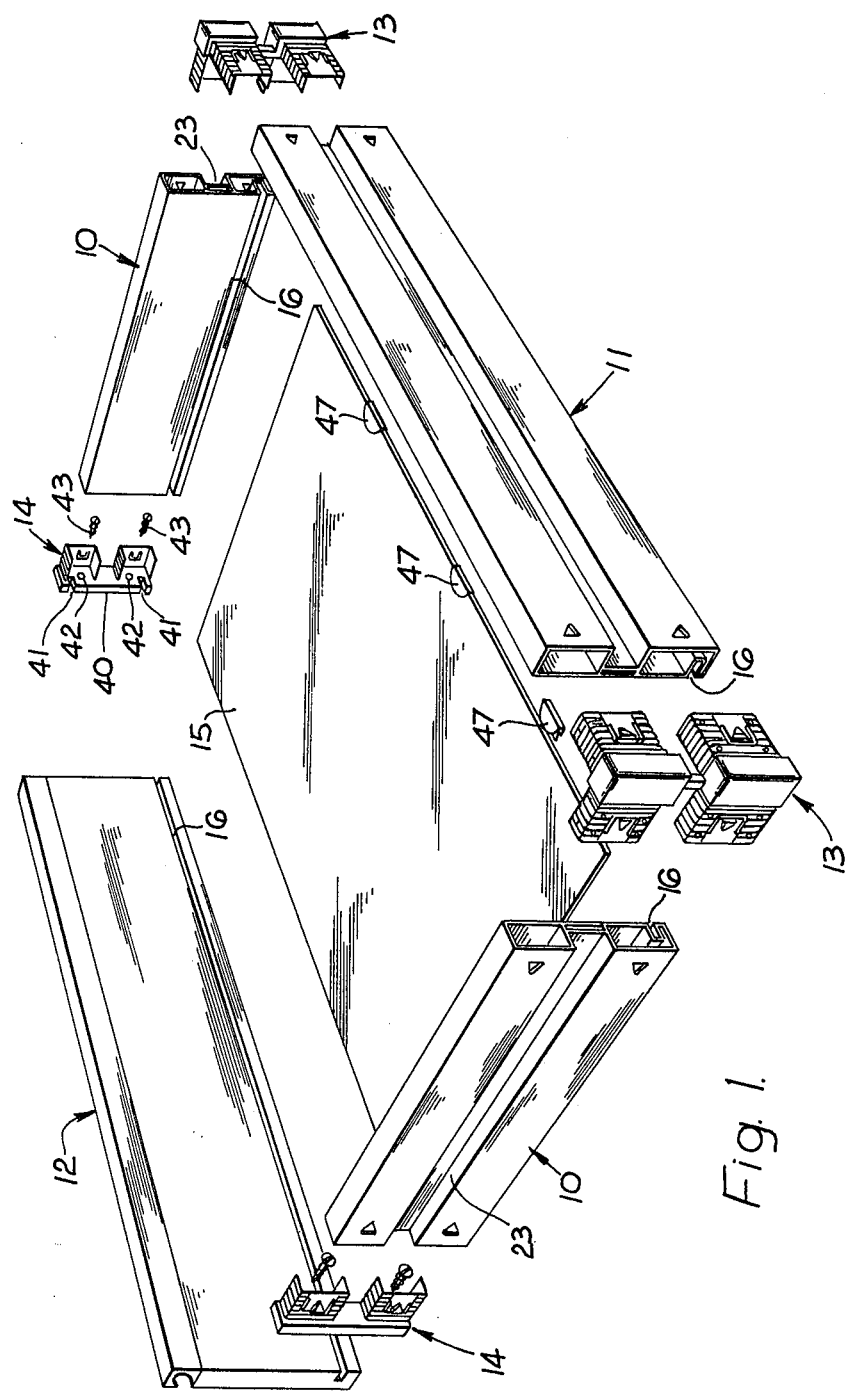
FIG. 1 is an exploded perspective view of a side hung drawer.

The drawer comprises a pair of hollow extruded plastics side walls 10, a like rear wall 11, a timber and/or plastics front 12, a pair of moulded plastics corner connecting members 13 for interconnecting the side and rear walls, a pair of front connecting members 14, also plastics mouldings, for connecting front 12 to the side walls, and a hardboard bottom panel 15 which is received in bottom grooves 16 defined in the lower inside edge portions of the walls and front.

Figure 2:
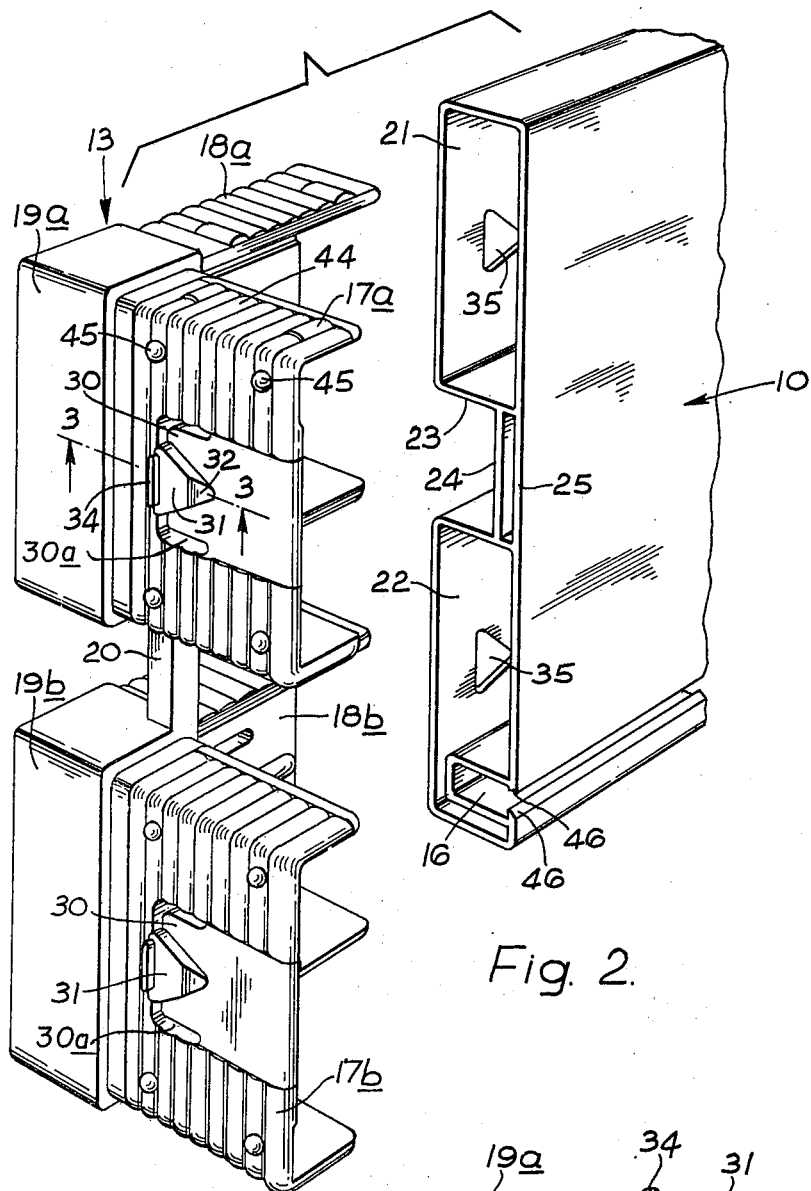
FIG. 2 is a perspective view of a corner connecting member and one end of a wall member of said drawer.
Figure 3:
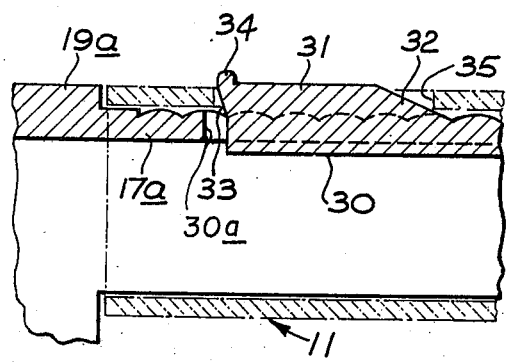
FIG. 3 is a section on line 3—3 of FIG. 2 with said members in an assembled condition.

Referring to FIGS. 2 and 3 each corner connecting member 13 has two pairs of upper and lower tenons 17a, 17b; 17a, 18b of channel section which project at right angles from hollow block-shaped upper and lower body portions 19a, 19b, these portions being interconnected by a rectangular finishing strip 20. The upper and lower parts of the member are identical so that it can be used either way up.

Side wall 10 defines upper and lower mortice sockets 21, 22 between which is a runner groove 23 opening to the outer face of the wall for receiving a drawer runner (not shown), the sides of said groove being defined by a pair of parallel webs which are carried across the full width of the extrusion and which are linked by a vertical web 24 forming the bottom of the groove and spaced from the inner face 25 of wall 10 to give added rigidity. Bottom groove 16 opens to this inner face.

On assembly, with tenon formations 18a, 18b pushed fully home into mortices 21, 22, body portions 19a, 19b and finishing strip 20 form continuations of wall 10 and fill in the corner between the end of that wall and the end of rear wall 11 while leaving the runner groove 23 unobstructed.

All the tenons are identical and only tenon 17a is now described in detail. A central region of the tenon is slotted in generally U-shaped fashion as shown at 30a (FIGS. 2 and 3) to define a resilient rectangular tongue 30 having its free end directed away from the free end of the tenon. Tongue 30 carries a laterally projecting retaining detent 31 which is triangular in elevation in the plane of the outer face of tenon 17a and arranged so that a leading end in the form of an acute angle tip 32 is directed away from the free end of tongue 30 and in the direction of the free end of the tenon. Edge faces of detent 31 diverge from tip 32 to join a transverse abutment face 33 of detent 31 which merges with the free end edge of tongue 30. Abutment face 33 is somewhat undercut as best seen in FIG. 3 and a projecting transverse lip 34 forms a lateral extension of detent 31 at its trailing end.

Triangular apertures 35 are punched in the outer side walls of mortices 21, 22 to snap engage with the detents 31 when the tenons are pushed fully home, the tips 32 on detents 31 being chamfered to assist in deflecting tongues 30 inwards when the tenons are first entered.

When assembled detents 31 substantially fill apertures 35 so that, apart from the chamfered tips, there is full engagement by the divergent edge faces, and in particular the abutment face 33, the undercutting of the latter and lip 34 giving particularly secure resistance to subsequent withdrawal of the tenon.

As the free ends of tongues 30 are directed away from the direction of insertion a force tending to pull out the tenons will merely engage detents 31 more tightly in apertures 35, this effect being increased by the undercut abutment faces 33.

The front connecting members 14 have a body portion 40 provided with a pair of upper and lower tenons for engagement with the front ends of side walls 10 in the identical manner to corner members 13. Body 40 has notches 41 to align with bottom grooves 16 whichever way up member 14 is used, and through slots 42 for receiving screws 43 attaching the front 12.

If it should be desired to dis-assemble the components due to an error in assembly, or in the case of front connecting members 14 the need for access to screws 43, a screwdriver or similar tool can be engaged with lip 34 to press tongue 30 inwards so as to free detent 31 from the associated aperture 35 and drive the tenon outwards so that the connecting member can be pulled free.

Apart from an area extending from tongues 30 to their free ends, the outsides of all the tenons are provided with a series of transverse ribs 44 which will provide an effective hold for an adhesive if it is desired that the components shall be permanently assembled by glueing. If glue is used apertures 35 need not be provided as tongues 30 will deflect inwardly and remain deflected within the mortices, or, if desired, the entire tongue and detent can readily be removed by cutting from the free end of the tenon to meet the slot. A glued construction is found to be advantageous to "do-it-yourself" constructors wishing to use non-standard lengths of wall extrusion and not having facilities for punching the triangular apertures 35.

Projecting pips 45 on the rubber outer faces of the tenons take up any slack in their fit in the mortices due to manufacturing tolerances.

Bottom grooves 16 are provided with lips 46 at their mouths (FIG. 2) to fit tightly against bottom panel 15, and the latter is additionally secured by metal clips 47 pressed into grooves 16 and having barbs to grip the hardboard (FIG. 1).

The invention may be applied to larger drawer, box or tray-like structures, for example deeper drawers, by providing the connecting members with extra tenons having tongues and retaining detents, and forming extruded hollow walls having transverse webs defining additional mortice sockets.

While the triangular detent is preferred other shapes may be employed such as diamond, shield or lozenge shapes with a chamfered or rounded leading end or tip, or possibly oval or D shaped with a curved leading end.

Having now described our invention what we claim is:

1. A set of elements for forming the side walls of a tray-like structure, said elements including a wall member defining a mortice socket opening to one end of said member and a connecting member having a body portion and at least one tenon formation having a free end insertable into the mortice socket to locate the body portion in predetermined alignment with the wall member to form the structure, the tenon formation being provided with a laterally projecting retaining detent for engagement in a mating aperture in a sidewall of the mortice socket to resist withdrawal of the tenon formation therefrom; wherein the improvement comprises:
    (a) means providing a central region of the tenon formation with a single, generally U-shaped slot defining a resilient tongue carrying said retaining detent at its free, resilient end, said free end of the tongue being directed away from the free end of the formation and being entirely bordered by the remainder of said tenon formation, said tenon formation free end constituting a one-piece, uninterrupted member;
    (b) said retaining detent having a leading end facing in the direction of the free end of the tenon formation and away from the free end of the tonque and a pair of edge faces diverging away from said leading end to an abutment part of the detent which is substantially broader than said end,
    (c) said mating aperture being a through aperture in said sidewall so that the detent is accessible from the exterior of the completed structure to enable release of the tenon formation from the mortice socket by pressing the abutment part of the detent and thus said tongue free end inward of the aperture to flex the resilient tongue, and
    (d) said detent having an acute angle leading tip and an abutment part in the form of a transverse face which merges with the free end of the tongue.

2. A set of elements according to claim 1 wherein the connecting member is a corner member having two similar pairs of tenon formations at right angles to connect side and rear wall members each having upper and lower mortice sockets.

3. A set of elements according to claim 1 wherein the connecting member is a front connecting member adapted to be attached to a front panel and having upper and lower tenson formations for engagement with upper and lower mortice sockets at the front end of a side wall member.

4. A set of elements according to claim 1 wherein the detent and mating aperture are triangular.

* * * * *